United States Patent [19]
Csipkes et al.

[11] Patent Number: 5,724,127
[45] Date of Patent: Mar. 3, 1998

[54] SYSTEM AND METHOD FOR INSPECTING AN END OF A FIBER OPTIC

[75] Inventors: Andrei Csipkes, Columbia, Md.; Glen D. Porter, Norcross, Ga.

[73] Assignee: Ciena Corporation, Linthicum, Md.

[21] Appl. No.: 808,722

[22] Filed: Feb. 27, 1997

[51] Int. Cl.$^6$ ............................................. G01N 21/88
[52] U.S. Cl. ............................................. 356/73.1
[58] Field of Search ................................... 356/73.1

[56] References Cited

FOREIGN PATENT DOCUMENTS

62-299738  12/1997  Japan ........................... 356/73.1

*Primary Examiner*—Vincent P. McGraw
*Attorney, Agent, or Firm*—Timothy Lohse

[57] ABSTRACT

An apparatus for inspecting an end surface of a fiber optic is provided having a scope body with an adapter that mates the scope body with a bulkhead connected to an end surface of a fiber optic, and a system for generating light at a selected angle to the end surface of the fiber optic, located within the scope body, so that the light impinges on the end surface of the fiber optic through the bulkhead at the selected angle. An image of the end surface of the fiber optic is generated wherein an imperfection located on the end surface of the fiber optic casts a shadow on the image of the end surface of the fiber optic. The image is received by an image receiving system wherein the imperfection on the end surface of the fiber optic is detected and enhanced due to the shadow in the image. A method for inspection an end surface of a fiber optic is also disclosed.

24 Claims, 8 Drawing Sheets

SYSTEM AND METHOD FOR INSPECTING AN END OF A FIBER OPTIC

BACKGROUND OF THE INVENTION

This invention relates generally to a system and method for inspecting an optical connection and in particular to a system and method for inspecting an end surface of a fiber optic.

As the number of computers and phones in use increases and correspondingly the amount of data being transmitted between locations increases, more and more fiber optics are being used to carry data, that may be a phone call or computer data, because the fiber optics can optically transmit a large amount of data rapidly. To transmit electronic data over a fiber optic, the electronic data is converted into light signals as is well known and sent along the fiber optic until it reaches its destination, where the light signals are converted back into electronic data. At various locations in a fiber optic network the optical signals may enter electro-optical modules that may reamplify the light signals, may filter light signals, or may convert the light signals back to electrical signals. The fiber optic usually connects to the electro-optical module through a bulkhead. The most critical part of the fiber optic is the end surface of the fiber optic which must be polished in a specific manner to very precise requirements. Therefore, these ends must have no imperfections so that data traveling over the fiber optic may pass through the connection between the fiber optics. These fiber optics, and the connection between the fiber optics and the electro-optical module must be inspected and cleaned from time to time because certain flaws on the end surface of fiber optics may cause increased signal losses or even an interruption in the transmission of electronic data.

A pair of fiber optics may be connected together using several different methods. First, the two ends of the fiber optics may be connected by a fusion process in which the two ends are fused together. Another method for connecting two fiber optics or connecting a fiber optic to an electro-optical module involves placing a connector on the end of the fiber optic. Then, the two connectors may be connected to either side of a coupler, known as a bulkhead, that mechanically secures the two connectors and the fiber optics together. Fiber optics are typically connected together using a bulkhead which permits the end surfaces of the fiber optics to be inspected from time to time.

In order to conventionally inspect the end surface of a fiber optic connected to a bulkhead, the connector and the end of the fiber optic in the connector are removed from the bulkhead and a conventional microscope may be used to view the end surface of the fiber optic and to determine if there are any imperfections, such as cracks, scratches, chips or dirt, on the end surface of the fiber optic. This method of inspection is slow, but acceptable for fiber optics wherein the end of the fiber optic is readily accessible. However, in a central fiber optic wavelength division multiplex location wherein, for example, many signals may be multiplexed onto a fiber optic, there may be a plurality of electro-optical modules that are located close together. For example, there may be an electro-optical module that receives an optical signal, such as an optical data line and which converts the wavelength of the line to a new wavelength according to a channel plan. Generally, each of these electro-optical modules has a housing and one or more bulkheads attached to and protruding through an opening in an outer panel of the housing of the module so that incoming or outgoing fiber optics with connectors may be connected to the electro-optical module through the bulkheads. The fiber optic located within the electro-optical module may be connected to the other end of the bulkhead inside of the electro-optical module. The end of the fiber optic outside the electro-optical module may be easily inspected in a conventional manner since the end may be readily disconnected from the bulkhead. However, the end of the fiber optic located within the electro-optical module may not be easily inspected because the outer panel of the electro-optical module must first be removed to expose the other side of the bulkhead and the end of the fiber optic located internally within the electro-optical module. The removal of the panel is time consuming and makes it more difficult to inspect the end of the fiber optic. Furthermore, the removal process jeopardizes the integrity of the electro-optical module, as it may damage (i.e., pinch, break or bend) the fiber optic lines within the electro-optical module.

In addition, routine maintenance must be performed on the electro-optical modules in which the ends of the fiber optics are inspected and cleaned. As described above, with a conventional microscope, the panel of the electro-optical module must be removed before the ends of each fiber optic are inspected. The bulkhead must then be reassembled and the panel attached back onto the electro-optical module. After this routine maintenance, a final inspection of the ends of the fiber optics should be conducted. However, a conventional microscope does not provide any way to inspect the ends of the fiber optics through the bulkhead.

One solution would be to inspect the end surface of the fiber optic visually through the bulkhead using a conventional microscope. However, the end surface of a fiber optic cannot be inspected by a conventional microscope through the bulkhead. In order to inspect a fiber optic for imperfections, one needs a bright light, a large amount of magnification and a high depth perception so that small imperfections on the end surface of the fiber optic may be detected. The large distance between the exposed end of the bulkhead and the end surface of the fiber optic reduces the depth perception so that small imperfections on the end surface of the fiber optic are very difficult to locate. The task of detecting imperfections is especially difficult because the core of the fiber optic may be no more than nine microns wide. Thus, a conventional microscope cannot inspect a fiber optic through a bulkhead with sufficient depth perception to be able to locate the imperfections in the end surface of a fiber optic.

Therefore, none of the conventional inspection systems permit the inspection of an end surface of a fiber optic through a bulkhead to an adequate degree of resolution to detect imperfections. These conventional systems require that the panel of an electro-optical module is removed so that the end of the fiber optic is exposed and the end may be inspected using a conventional microscope, which is a slow process. In addition, final inspection of an electro-optical module after routine maintenance is also not possible with a conventional system.

Thus, there is a need for a system and method for inspecting a fiber optic which avoid these and other problems of known devices, and it is to this end that the present invention is directed.

SUMMARY OF THE INVENTION

The invention provides an apparatus and method for inspecting an end surface of a fiber optic wherein the end surface of the fiber optic may be inspected through a bulkhead. The apparatus may inspect the fiber optics through a bulkhead which in turn is attached to an electro-optical module without disassembling the electro-optical module. In addition, during routine maintenance of the electro-optical module, the end surfaces of the fiber optics may be cleaned through the bulkhead and the end surfaces may then be inspected through the bulkhead which reduces the time required for maintenance.

The invention also provides an apparatus and method for inspecting an end surface of the fiber optic wherein the angle that the illumination from the inspection system impinges upon the end surface of the fiber optic may be adjusted so that an imperfection on the end surface of the fiber optic, due to the non-perpendicular light, casts a shadow on the end surface of the fiber optic. The shadow may be detected more easily than the actual imperfection which enhances the resolution of the image generated by the inspection apparatus. The inspection apparatus may also have an anti-reflective diaphragm and coating that remove the bright reflections caused by the translucent surface of the fiber optic connector's zirconia ferrule which holds the fiber and caused by the reflections generated by the otherwise reflective surfaces inside the microscope's optical tube so that the contrast of the core part of the fiber optic is improved. The anti-reflective coating inside the microscope's optical tube effectively reduces the reflections that are inherent when an image is optically projected over a relatively long distance and, hence, increases the image quality. The inspection apparatus may be a portable microscope, running on battery power, that may inspect an end of a fiber optic through a bulkhead using light that may be non-perpendicular to the surface of the fiber optic, generate an optical image of the end surface, and convert the optical image into a plurality of electrical signals so that the image may be transmitted electronically, such as via e-mail, to a manufacturer at a remote location who may review the images. Furthermore, this eliminates any risk of exposing one's eye to laser emissions that may occur if the fiber optic being tested is still connected to a laser source (i.e., "live").

In accordance with the invention, an inspection apparatus is provided having a scope body with an adapter that mates the scope body with a bulkhead connected to an end surface of a fiber optic, and a system for generating light at a selected angle to the end surface of the fiber optic, located within the scope body, so that the light impinges on the end surface of the fiber optic through the bulkhead at the selected angle. An image of the end surface of the fiber optic is generated wherein some imperfections located on the end surface of the fiber optic cast shadows on the image of the end surface of the fiber optic. The image is received by an image receiving system wherein the imperfection on the end surface of the fiber optic is detected and may be enhanced (depending on the type of imperfection) due to the shadows in the image. A method for inspection of an end surface of a fiber optic is also provided.

DETAILED DESCRIPTION OF A PREFERRED EMBODIMENT

The invention is particularly applicable to an apparatus and method for inspecting an end surface of a fiber optic through a bulkhead wherein the bulkhead is attached to an electro-optical module. It is in this context that the invention will be described. It will be appreciated, however, that the apparatus and method in accordance with the invention has greater utility, including, for example, inspecting purely optical modules and switching systems.

Prior to describing the apparatus, a brief description of an electro-optical module that may be inspected with an inspection apparatus in accordance with the invention will be provided. In addition, the physical structure of a fiber optic, various types of bulkheads, and the structure of the fiber optic within a bulkhead will be briefly described.

Figure 1:
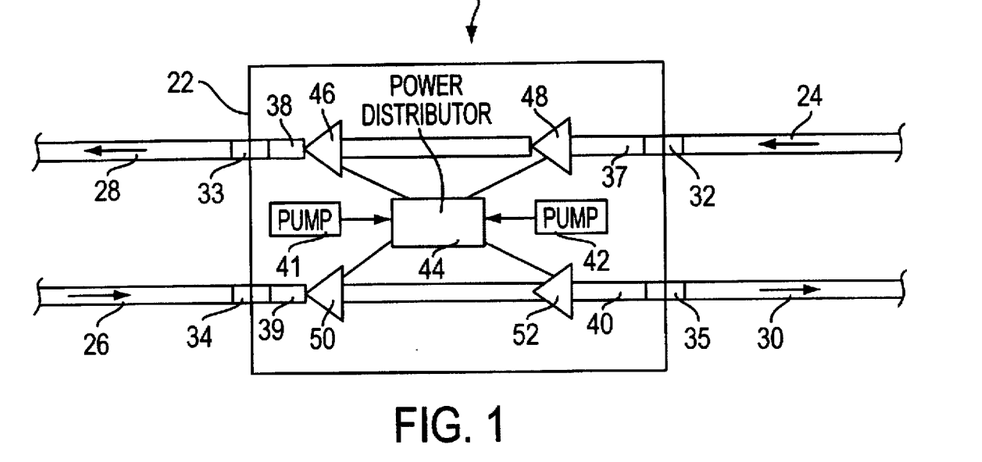
FIG. 1 is a diagram of an electro-optical module that may be inspected using the inspection apparatus in accordance with the invention.

FIG. 1 is a diagram of an electro-optical module 20 that may have a housing 22. As an example, an in-line amplifier electro-optical module will be described, but the inspection apparatus in accordance with the invention may be used to inspect any type of electro-optical module. For the in-line amplifier, a first incoming fiber optic 24 and a second incoming fiber optic 26 enter the electro-optical module. The first fiber optic may carry signals in a first direction while the second fiber optic carries signals in the opposite direction. The in-line amplifier reamplifies the light signals on each of the fiber optics and then outputs the reamplified signals over a first outgoing fiber optic 28 and a second outgoing fiber optic 30, respectively. The incoming and outgoing fiber optics may be connected to the in-line amplifier by a plurality of bulkheads 32, 33, 34, 35 that may be attached to the in-line amplifier. The end of each bulkhead within the in-line amplifier may be connected to an internal fiber optic 37, 38, 39, 40, respectively. The end surfaces of these internal fiber optics may be inspected through the bulkhead in accordance with the invention. Within the in-line amplifier, a pair of laser pumps 41, 42 generate laser power that may be routed to a power distributor 44. The power distributor, that may also be known as a splitter, may distribute the laser power to several amplifiers 46, 48, 50, 52 that amplify the optical signals in a known matter being transmitted over the fiber optic. Now, the details of the bulkheads that attach the incoming and outgoing fiber optics to the in-line amplifier will be described.

Figure 2:
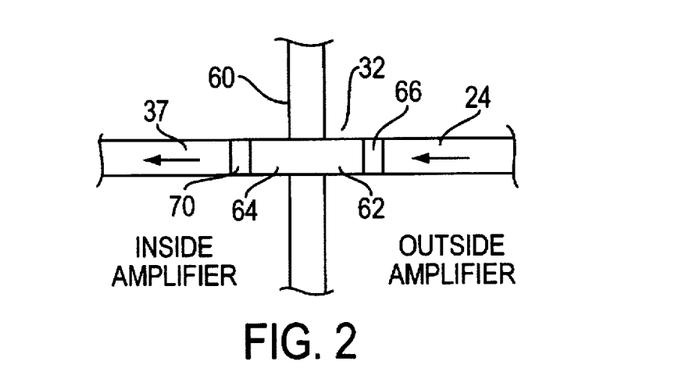
FIG. 2 is a close-up diagram of the bulkhead of the electro-optical module of FIG. 1.

FIG. 2 is a diagram showing the bulkheads of FIG. 1 that may attach the incoming and outgoing fiber optics to the in-line amplifier. The details of the bulkhead 32 only will be described because the other bulkheads are similar. The bulkhead may be attached to a panel 60 of the housing of the in-line amplifier. As shown, a first end 62 of the bulkhead is outside of the in-line amplifier while a second end 64 of the bulkhead is inside the in-line amplifier and would require that the panel be removed in order to access the second end of the bulkhead. The incoming fiber optic 24 may have a connector 66 attached to its end which is in turn connected to the first end of the bulkhead. The fiber optic 37 within the in-line amplifier may also have a connector 70 that connects to the second end of the bulkhead 32 so that the two fiber optics are connected together. The end surface of the fiber optic 37 may only be inspected by a conventional microscope by removing the panel from the in-line amplifier. By contrast, as described below, the end surface of the fiber optic 37 may be inspected, in accordance with the invention, by first removing the incoming fiber optic 24 from the bulkhead 32, mating an inspection apparatus to the first end 62 of the bulkhead, and inspecting the end surface of fiber optic 37 through the bulkhead. Now, the structure of a fiber optic and various bulkheads will be described.

Figure 3:
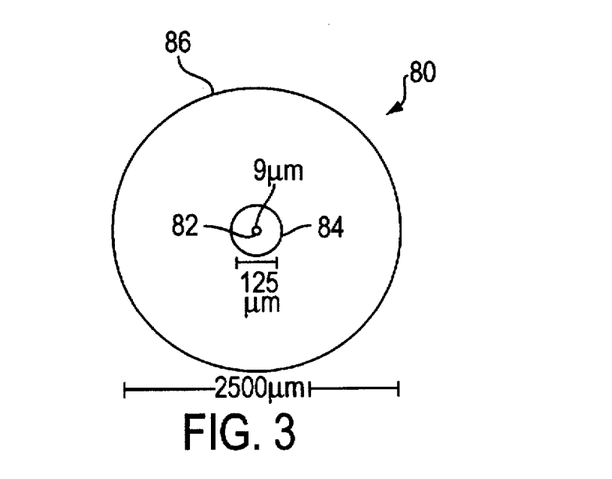
FIG. 3 is a diagram of an end surface of a fiber optic that may by inspected in accordance with the invention.

FIG. 3 is a diagram of an end surface of a typical fiber optic 80. The fiber optic may consist of a core region 82 and a cladding region 84 that may both be manufactured out of glass. The core region may be approximately nine microns wide. The core region transmits the optical signals traveling along the fiber optic so that the end surface of the core region must not have any surface imperfections. The inspection apparatus in accordance with the invention may detect imperfection within this core region and the immediate 125 micron surrounding region. The cladding region 84 may have a different refractive index than the core region and may be approximately 125 microns wide. The cladding region may reflect light so that transmitted light waves remain in the core region. The cladding region may be surrounded by a ferrule region 86 that may be manufactured out of zirconia and may be approximately 2500 microns wide. The ferrule region may protect the core region and the cladding region from damage. Now, an example of several bulkheads that may be used to connect fiber optics will be described.

Figure 4:
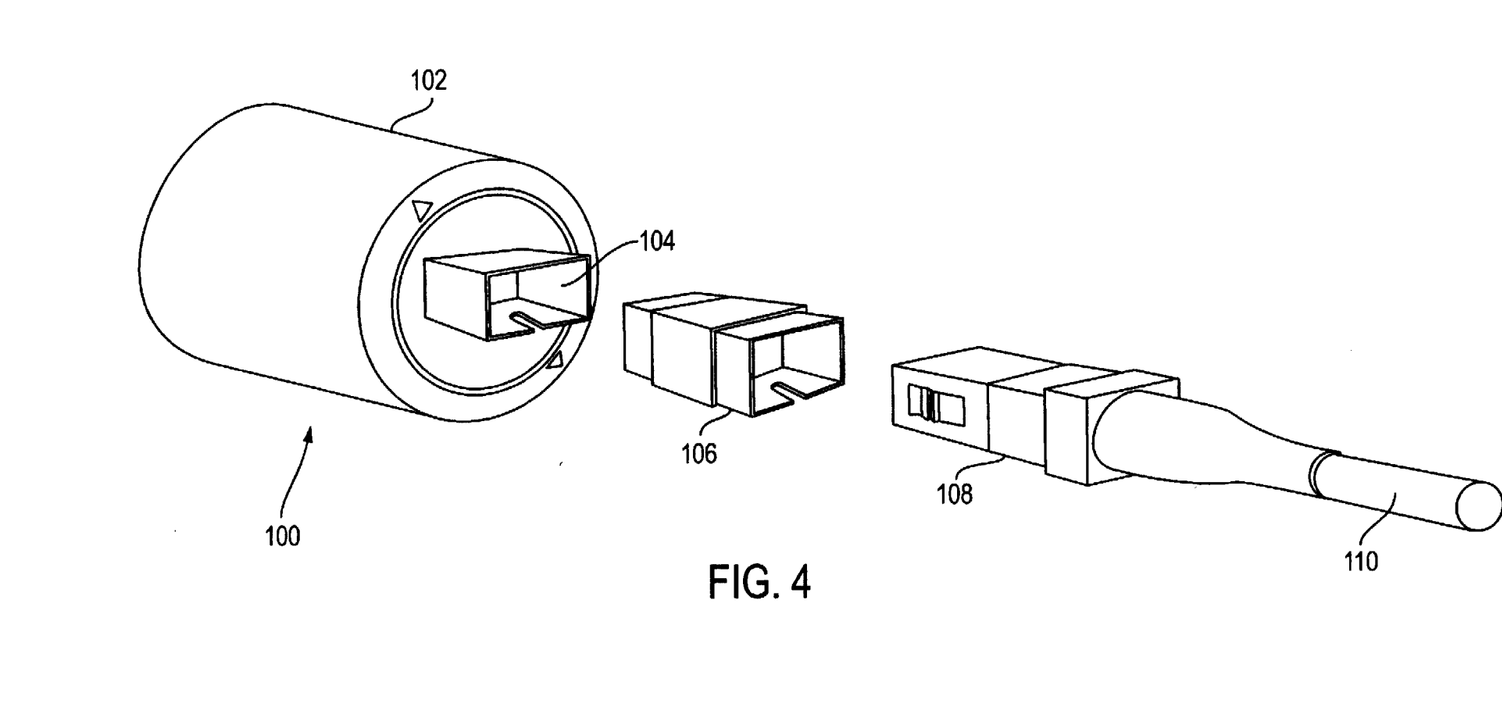
FIGS. 4, 5 and 6 are diagrams of three examples of the types of bulkheads through which an end surface of a fiber optic may be inspected in accordance with the invention.

FIG. 4 is a perspective view of an example of a first type of bulkhead adapter 100 that may be used to inspect an end surface of a fiber optic through an SC bulkhead in accordance with the invention. As shown, the bulkhead adapter may have a circular outer housing 102 and an inner rectangular opening 104. A SC bulkhead 106 may fit within the rectangular opening 104 of the bulkhead adapter and may also attach to an SC connector 108 of a fiber optic 110. As described below, the bulkhead adapter 100 attached to the inspection apparatus in accordance with the invention may mate with the SC bulkhead 106 which may in turn be connected to the SC connector 108 of the fiber optic 110. Now, an example of another type of bulkhead adapter will be described.

Figure 5:
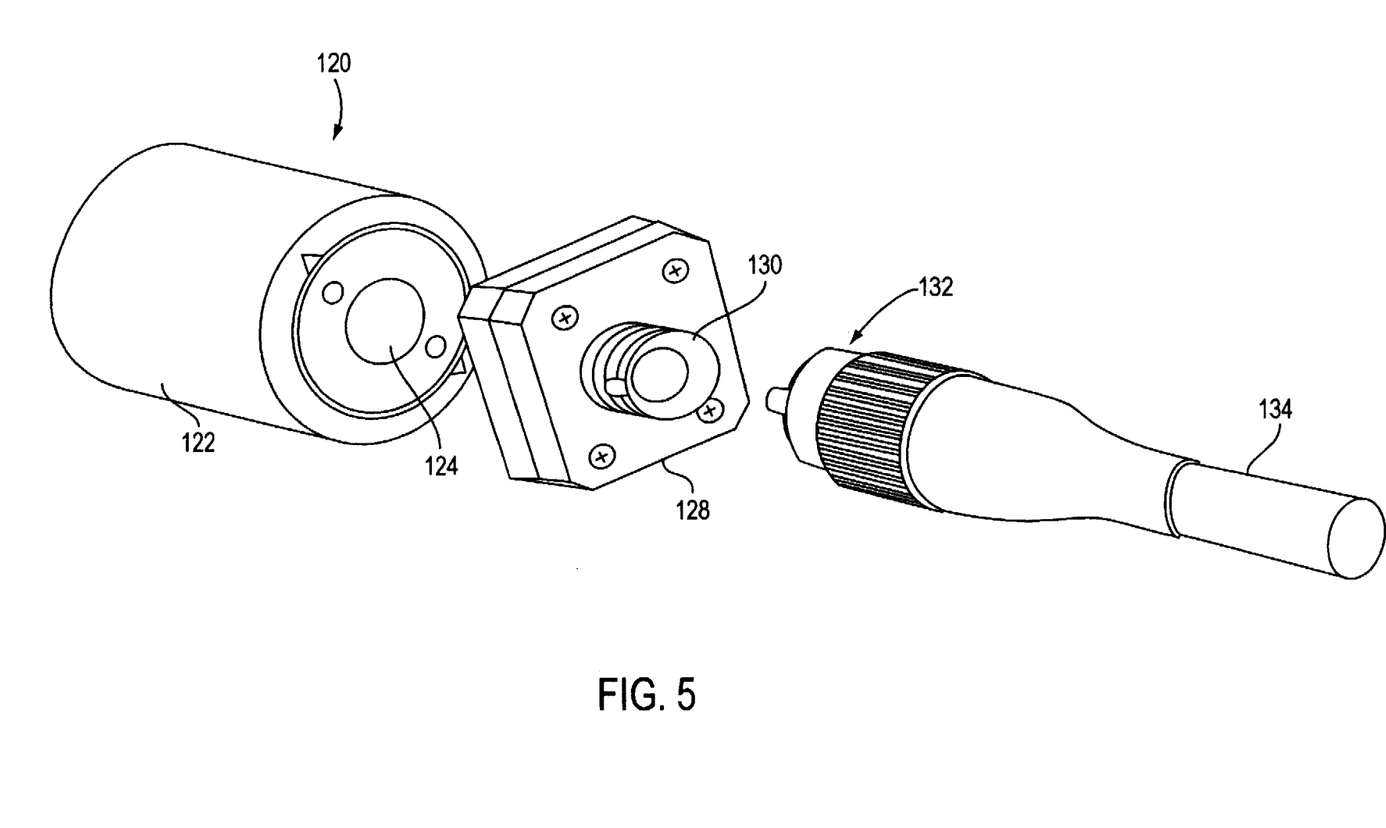

FIG. 5 is a perspective view of an example of a second type of bulkhead adapter 120 that may be used to inspect an end surface of a fiber optic through an FC bulkhead. The bulkhead adapter 120 may have a circular outer housing 122 and an inner circular opening 124. An FC bulkhead 128 having a circular inner opening 130 that may mate with the circular opening of the bulkhead adapter 120 and also to an FC connector 132 that in turn is connected to a fiber optic 134. As shown, a different bulkhead adapter than the adapter for the bulkhead shown in FIG. 4 must be attached to the inspection apparatus since this bulkhead has a circular opening. In accordance with the invention, the inspection apparatus may mate with a plurality of different bulkheads using a plurality of different bulkhead adapters, and the bulkheads shown are only illustrative of different types of bulkheads. Now, another example of a bulkhead through which a fiber optic may be inspected by the scope in accordance with the invention will be described.

Figure 6:
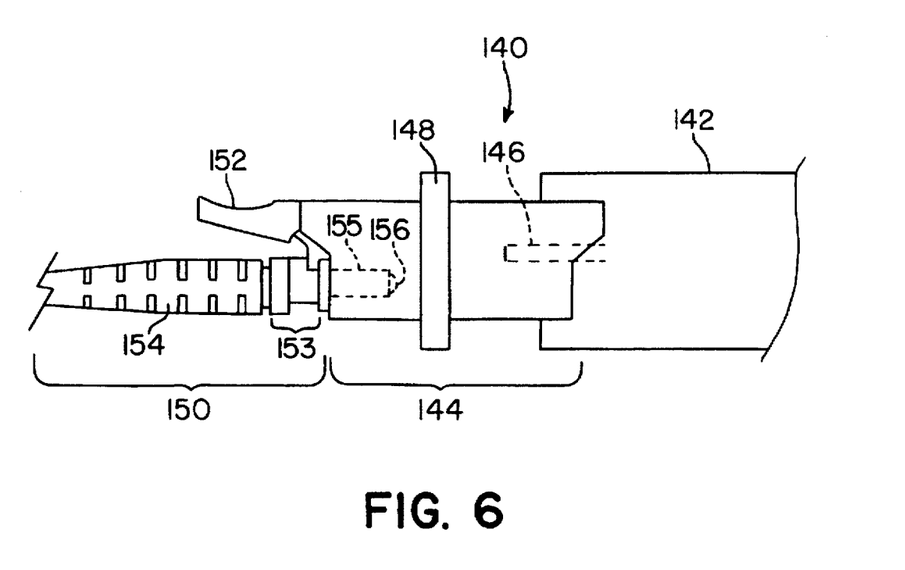

FIG. 6 is a side view of an example of a third type of bulkhead adapter 140 that may be used to inspect an end surface of a fiber optic through an E2000 bulkhead in accordance with the invention. A scope end 142 may mate with a bulkhead adapter 144 as shown. The scope body may have an adapter guide pin 146 that aligns the scope optical axis with the fiber optic's optical axis. The adapter 144 may include a central ring 148 and an E2000 bulkhead 150 may be attached to the adapter 144 by a depressable latch 152 on the bulkhead. The bulkhead may also have a first cylindrical portion 153 and a second flexible rubber portion 154 that may prevent damage to a fiber optic 155 located within the bulkhead. The fiber optic may have a domed end surface 156 that may be inspected through the bulkhead using the scope in accordance with the invention. As described above, the scope may mate with the bulkhead adapter 144, but not attach to the adapter so that the scope may be easily disengaged from the bulkhead once the inspection has been completed. Now, an inspection apparatus in accordance with the invention will be described.

Figure 7:
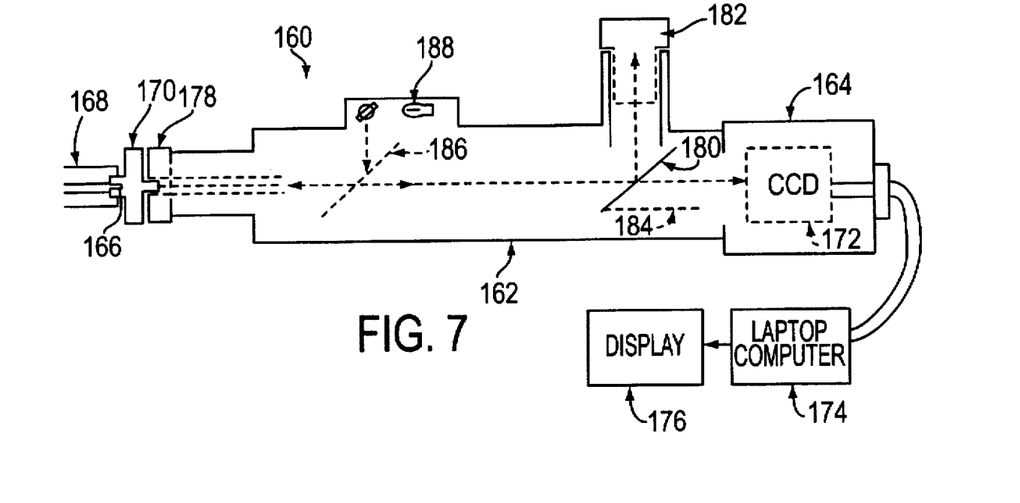
FIG. 7 is a schematic diagram of an apparatus for inspecting an end of a fiber optic in accordance with the invention.

FIG. 7 is a diagram illustrating a portable scope 160 for inspecting an end surface of a fiber optic in accordance with the invention. The scope may have a body portion 162 and a handle portion 164 that may be attached together. The scope, in accordance with the invention, may be battery powered so that it is portable. The scope may be used to inspect an end surface 166 of the core region of a fiber optic 168 through a bulkhead 170, as described below.

The handle portion 164 of the scope 160 may house an image receiving device 172 that may receive an optical image and generate electrical signals corresponding to the received optical image. The image receiving device may be a charge coupled device (CCD) or any other type of device that can convert optical images into electrical signals. A CCD may be a preferred image receiving device because the low power consumption of the CCD is ideal for a battery powered scope. The structure and operation of an image receiving device are well known and will not be described here. The electrical output of the image receiving device may be transmitted to a computer 174, such as a laptop computer, and displayed on a display 176 attached to the computer. Since the image has been converted into electrical signals, the electrical signals corresponding to the image may also be transmitted, over a communications link, to a remote location and the image of the end surface may be viewed at the remote location. For example, a company may have a technician in the field conduct the inspection, and the electrical signals corresponding to the optical images may be viewed by the technician on a laptop computer and may also be transmitted over a communications system, such as the Internet or a modem and a phone line, to the headquarters of the company so that multiple people can review the images to determine whether the end surface of the fiber optic has an imperfection. In accordance with the invention, an optical image of the end surface 166 may be viewed by the operator of the scope, but the image may also be converted into electrical signals so that the images may be transmitted to a remote location or saved for future review.

The body 162 may have a bulkhead adapter 178 that removeably attaches onto the end of the body 162. The scope may have a plurality of different adapters that attach to the scope so that the scope may inspect a fiber optic through a plurality of different bulkheads, such as an SC bulkhead, an FC bulkhead and an E2000 bulkhead, as described above. The bulkhead adapter may mate with the bulkhead 170. For example, the bulkhead adapter may fit over the bulkhead, but does not latch or connect in any way to the bulkhead so that the scope may be easily removed from the bulkhead and moved to another bulkhead. The mating of the bulkhead and the bulkhead adapter provides sufficient alignment of the scope with the fiber optic to inspect the end surface of the fiber optic, but does not attach the scope to the bulkhead.

The body may also house a number of optical components that form an optical path so that an image of the end surface of the fiber optic may be generated. The body may have a first optical component 180 that may be a tiltable reflective device, such as a mirror or polished piece of metal. The tiltable reflective device may receive an optical image of the end surface of the fiber optic and reflect that optical image either to the image receiving device 172 or to an eyepiece receptacle 182 based on the position of the tiltable reflecting device. The mirror in the original position will reflect light to the eyepiece receptacle 182 so that an operator of the scope may view the end surface of the fiber optic while, the mirror in a second position 184 may permit the light to be received by the image receiving device 172. Thus, in accordance with the invention, the image of the end surface of the fiber optic may be viewed by the operator of the scope or the image may be converted into electrical signals, and the electrical signals may be transmitted to a remote location or stored for later viewing, as described above.

The body 162 may also have a second optical component 186 that may reflect light from a light generator 188 onto the end 166 of the fiber optic 168 and may also transmit any light reflected off of the end surface of the fiber optic so that the image travels back to the tiltable reflective device 180. The second optical component may be a partially mirrored surface of a prism, as described below. The light generator 188 may generate light that impinges on the end surface of the fiber optic at an selected angle, as described below, so that any imperfections on the end surface of the fiber optic will cast a shadow on the end surface of the fiber optic. The shadows may be more easily seen and may be used to detect the presence of imperfections. The angle of the light from the light generator may be adjusted manually by a user of the scope or may be adjusted automatically to locate the best angle which generates the best image, as described below. The details of the light generator will be described in more detail below. An example of the angular light and the effect on viewing an imperfection will now be briefly described.

Figure 8A:
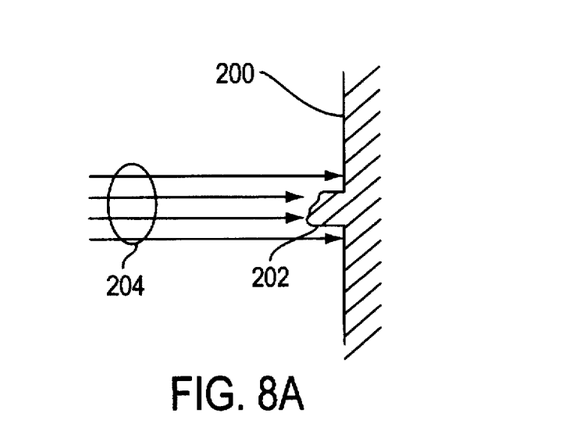
FIGS. 8A is a diagram illustrating an imperfection in a fiber optic being illuminated in a conventional manner by perpendicular light.
Figure 8B:
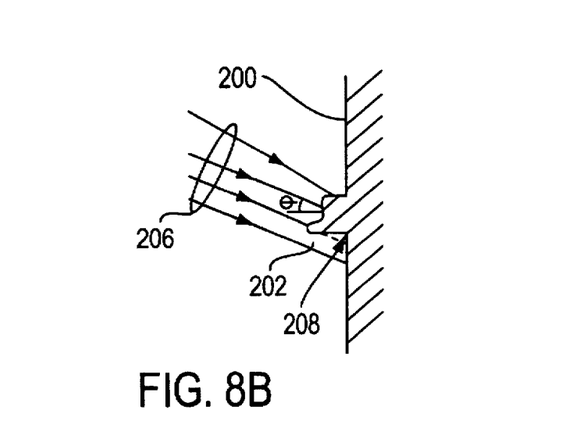
FIG. 8B is a diagram illustrating an imperfection in a fiber optic being illuminated by non-perpendicular light in accordance with the invention.

FIG. 8A is a diagram of an end surface 200 of a fiber optic. The end surface may have an imperfection 202 that should be located by an inspection system. With a conventional inspection system that illuminates the end surface with a plurality of beams of light 204 that are approximately perpendicular to the end surface, an image may be generated wherein the imperfection may be located by the odd shape of the imperfection. However, the imperfection may be less than a micron wide so it may be very difficult to see in the image. In addition, the imperfection will have the same shading as the end surface so there is no contrast between them. FIG. 8B is a diagram of the end surface 200 with the imperfection 202. However, in accordance with the invention, a plurality of light beams 206 may impinge the end surface of the fiber optic at some angle Θ to the end surface. As shown, due to the angle of the illuminating light, a shadow 208 may be cast on the end surface of the fiber optic. The shadow creates a contrast between the end surface and the imperfection because the shadow is darker or lighter than the rest of the end surface. Therefore, a person reviewing an image may look for a shadow, which is easier to locate on the image. Now, the operation of the apparatus in accordance with the invention will be briefly described.

In operation, the scope 160 may be mated with a bulkhead 170, as described above, and the operator of the scope may select, using the tiltable reflecting device 180, to either view the image through the eyepiece receptacle 182 or transmit the image to the image receiving device 172. Next, the operator may manually or automatically adjust the angle of the light generated by the light generator 188, as described below, so that the end surface 166 of the fiber optic 168 is illuminated. The image of the illuminated end surface may then be either viewed by the operator through the eyepiece or converted into electrical signals by the image receiving device. The light generated by the light generator at an adjustable angle to the end surface of the fiber optic may produce a shadow on the image when an imperfection is present on the end surface. Now, more details about the structure of the scope will be described.

Figure 9:
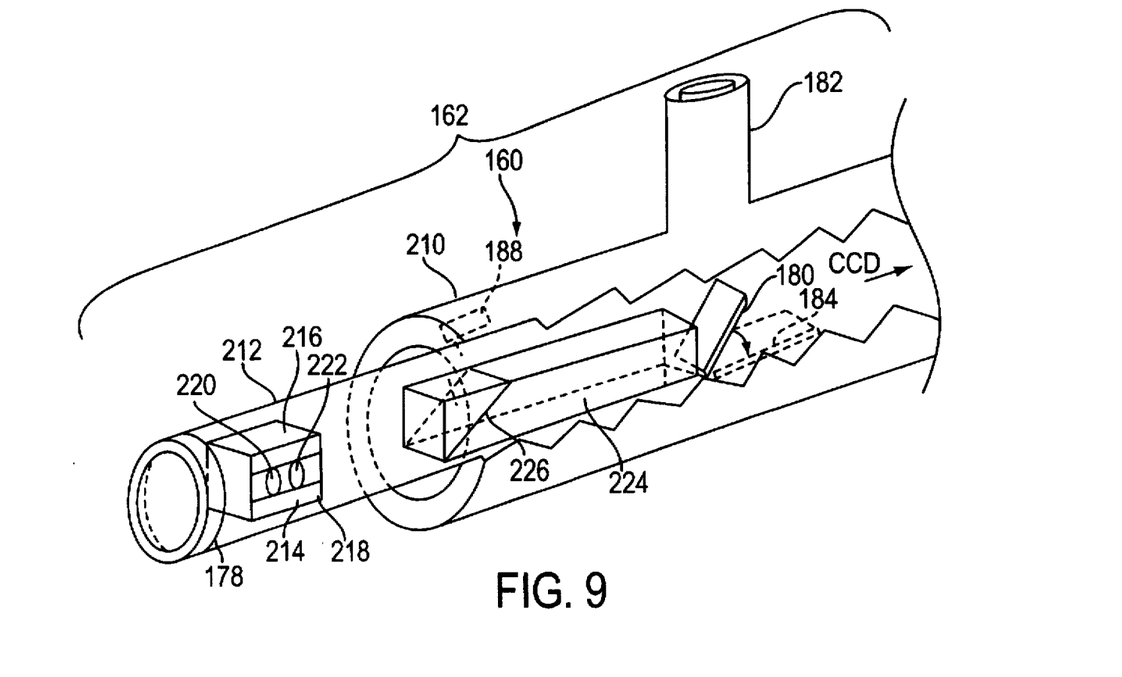
FIG. 9 is a partially cutaway perspective view of an apparatus for inspecting an end of a fiber optic in accordance with the invention.

FIG. 9 is a partially cut-away perspective view of the scope 160. The body 162 of the scope may have a larger diameter rear portion 210 that may have the eyepiece receptacle 182, and a smaller diameter front portion 212. The smaller diameter front portion may have a diameter of about one inch and may have a bulkhead adapter 178 attached. The extended length of the front portion makes it easier to inspect the fiber optics of hard to reach bulkheads. For example, many electro-optical modules may have hard to reach bulkheads that require the smaller diameter front portion.

At the end of the front portion 212 farthest from the image receiving device, a primary lens assembly 214 may be located. The primary lens assembly may focus the light that illuminates the end surface of the fiber optic and may also focus the image of the end surface. The primary lens assembly may have an upper mounting block 216, a lower mounting block 218, a first lens 220 and a second lens 222. The details of the primary lens assembly will be described below. The larger diameter rear portion 210 may house a prism 224 that may be manufactured out of glass. The prism may have a front half- mirrored surface 226 at an angle, such as 45 degrees, to the optical path so that light generated by the light generator 188 may illuminate the end surface of the fiber optic. The half-mirrored surface may also transmit an optical image of the end surface of the fiber optic to the eyepiece receptacle 182 or the image receiving device (not shown). The larger diameter rear portion may also house the tiltable reflecting device 180 in a first tilted position in which the image of the end surface is viewed through the eyepiece receptacle 182. If the tiltable reflecting device is in the second flat position 184, the image of the end surface will impinge upon the image receiving device. Now, a description of the mating between the scope and a bulkhead will be described.

Figure 10:
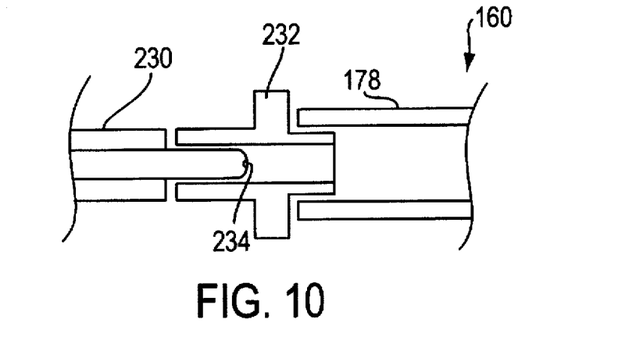
FIG. 10 is an expanded view illustrating a bulkhead adapter of the inspection apparatus mating with a bulkhead.

FIG. 10 is a diagram of the scope 160 being mated to a fiber optic 230 in accordance with the invention. As described above, the scope may have the bulkhead adapter 178 attached to the front end of the scope. The bulkhead adapter may be removed and replaced with another bulkhead adapter, depending on the type of bulkhead, so that the scope may be used to inspect fiber optics through a plurality of different bulkheads. For the bulkhead adapter shown, the bulkhead adapter fits over a bulkhead 232. The bulkhead adapter is not attached or latched to the bulkhead so that the scope may be easily moved to another bulkhead quickly. The bulkhead adapter also ensures that a core 234 of the fiber optic is correctly aligned with the light generated by the scope. Now, the detailed structure of the scope and the path of the light through the scope will be described.

Figure 11:
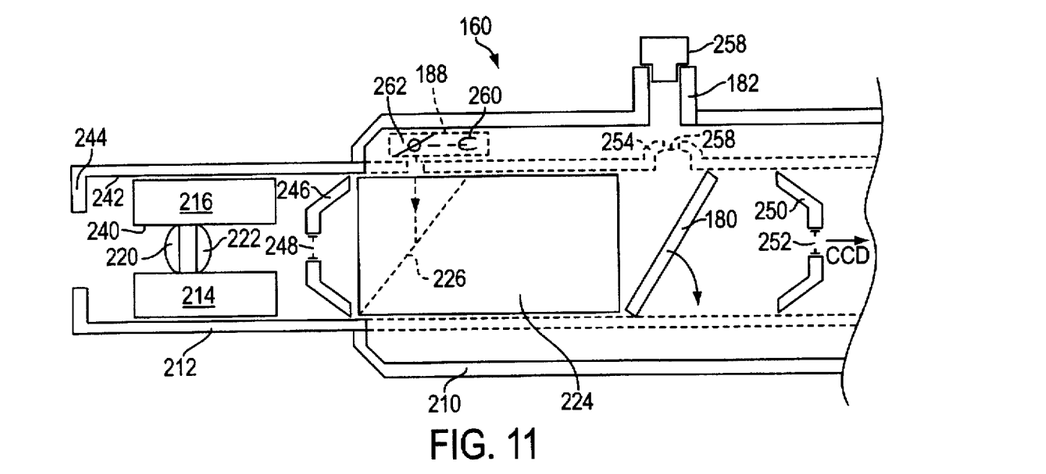
FIG. 11 is a more detailed cut-away side view of the apparatus for inspecting the end of a fiber optic of FIG. 9.
Figure 12:
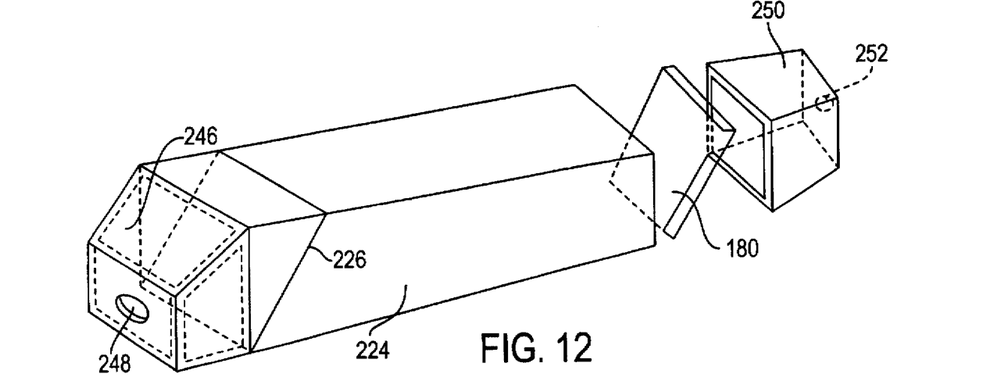
FIG. 12 is a more detailed diagram illustrating the anti-reflective portion of the apparatus of FIG. 9.

FIG. 11 is a cutaway side view of the scope 160 showing more details of the optical path within the scope and FIG. 12 is a perspective view of the anti-reflection mechanism that is part of the scope. Since light is being transmitted through the scope, the inner walls of the entire scope may have a reflecting absorbing coating, such as black paint, in order to reduce any undesirable reflections. For example, an inner surface 240 of the upper mounting block 216 may have the coating as well as an inner surface 242 of the front portion 212 of the scope. In order to further reduce any undesired reflections, a first diaphragm 244 at the front of the scope limits any undesirable reflections from outside of the scope. A second diaphragm 246 may be located adjacent to the prism 224 and may further limit the amount of reflections that are transmitted to the eyepiece or the image receiving device. An aperture 248 of the second diaphragm may be approximately 100 microns wide, which is the approximate width of the glass regions of a fiber optic. Since the zirconia portion of a fiber optic connector tends to reflect a large amount of light which may make it difficult to view the much darker image generated by the fiber glass portions, it is desirable to filter out the light reflected by the zirconia portion and the aperture has been chosen to accomplish that result. There may be a third diaphragm 250 adjacent to the tiltable reflecting device 180 that further reduces any undesired reflections. An aperture 252 of the third diaphragm may have a similar size to the aperture 248 of the other diaphragms. To further reduce undesired reflections, a fourth diaphragm 254 with an aperture 256 may be located adjacent the eyepiece receptacle 182 to reduce the reflections that the operator of the scope may view through the scope. Finally, the viewing lens may have a filter to block laser emissions that may be generated by a "lighted" fiber core that is connected to a laser source to prevent damage to an operator's eye.

The scope may have an eyepiece receptacle 182 that may mate with a plurality of different interchangeable eyepieces 258 that may have different magnifications. Therefore, the magnification of the scope may be easily changed. The light used to illuminate the end of the fiber optic may be white light, but may also be ultraviolet light. Thus, the light generator 188 that generates the light which may be at an angle to the end surface of the fiber optic, may have a light source 260, such as a small light bulb or any other light emitting device that emits white light or ultraviolet light, and a second tiltable reflective device 262, such as a mirror. The tilt of the mirror may be adjusted either manually or automatically to adjust the angle of the light impinging the end surface of the fiber optic. In the manual adjustment embodiment, an operator of the scope may adjust the angle of the mirror using, for example a knob on the outside of the scope (not shown), until a desired illumination of the end surface of the fiber optic is generated. In the automatic adjustment embodiment, the light generator may be connected to an image processor (not shown) that may analyze the image of the end surface of the fiber optic and adjust the mirror until the optimal image is obtained.

Figure 13:
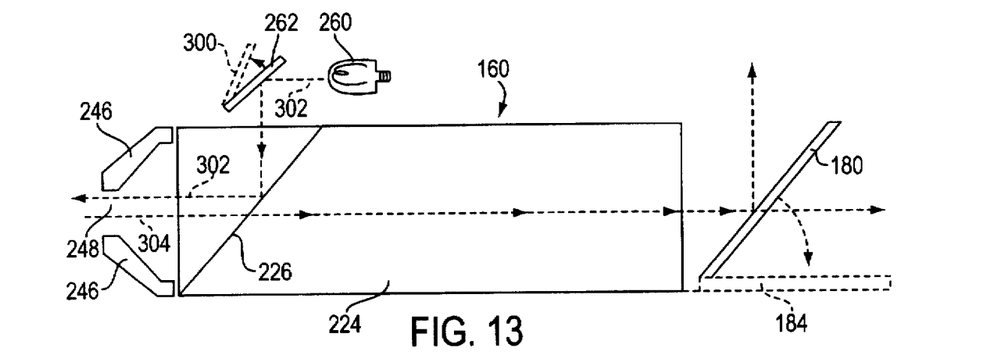
FIG. 13 is a more detailed diagram illustrating the path of light through the apparatus of FIG. 9.
Figure 14:
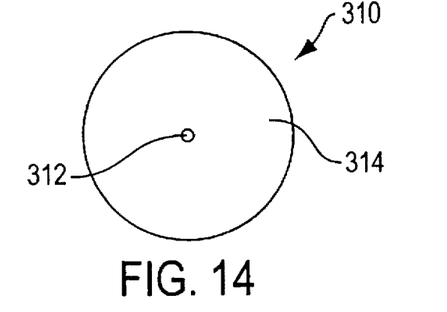
FIG. 14 is a diagram illustrating an image of an end surface of a fiber optic when the end surface is clean.
Figure 15:
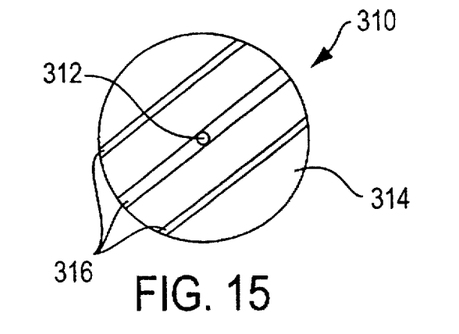
FIG. 15 is a diagram illustrating an image of an end surface of a fiber optic when the end surface is scratched.
Figure 16:
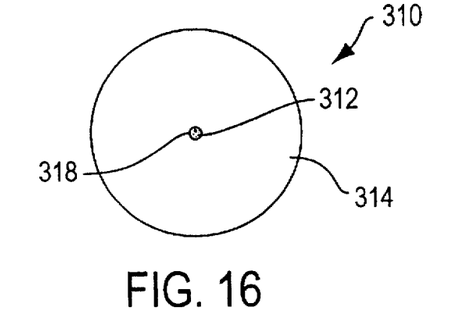
FIG. 16 is a diagram illustrating an image of an end surface of a fiber optic when the end surface is dirty.
Figure 17:
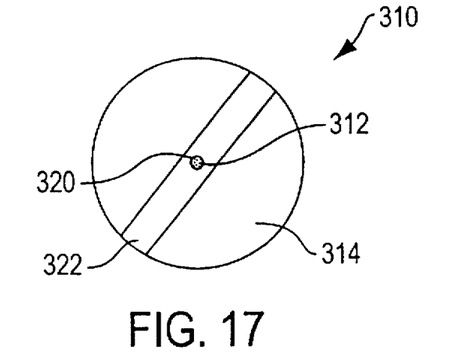
FIG. 17 is a diagram illustrating an image of an end surface of a fiber optic when the end surface is both dirty and scratched.

FIG. 13 is a diagram illustrating the path of light within the scope in accordance with the invention. The light illuminating the end surface of the fiber optic may be generated by the white light source 260 and reflected off of the mirror 262 that may be tilted between a plurality of positions including a first position 300 so that the angle of the light may be adjusted. A light ray 302 may be generated by the white light source, reflected off of the tiltable mirror, reflected off of the half-mirrored surface 226 of the prism, through the aperture 248 of the diaphragm 246 and impinge on the end surface. An optical image 304 of the end surface may travel back through the aperture 248 of the diaphragm 246 and through the half-mirrored surface of the prism. The image may then either travel to the eyepiece or to the image receiving device, depending on the position of the tiltable reflecting device 180. Now, several examples of the images generated by a end surface of a fiber optic in various conditions will be described.

FIGS. 14–17 are diagrams of images of a fiber optic 310 that may have a core region 312 and a fiber region 314. In the image shown in FIG. 14, the end surface of the fiber optic is clean and unscratched so that the core region of the fiber optic may appear white while the fiber region may appear dark or gray. This is the image of an end surface of a fiber optic that does not have any imperfections. In the image shown in FIG. 15, the end surface of the fiber optic is scratched so that a scratch 316 may appear as black or white irregularities (or other variations of gray) against the dark background of the fiber region. This scratch may cause the light signals being transmitted over the fiber optic to be partially or completely lost. In the image shown in FIG. 16, the end surface of the fiber optic has particles of dirt 318 so that the usually white core region is dark and cannot transmit any light signals. Finally, in the image shown in FIG. 17, the end surface of the fiber optic is scratched and dirty causing dark dirt particles 320 to appear in the core region and causing a scratch 322 to appear across the core region and the fiber region. As shown, various different imperfections in the end surface of the fiber optic cause different images to be generated.

In summary, the invention provides a portable scope for inspecting the end surface of a fiber optic through a bulkhead wherein the end surface of the fiber optic may be illuminated with light at an angle to the end surface so that imperfections in the end surface may be more easily detected. The scope also may have anti-reflection diaphragms that reduce the undesired reflections, which often occur primarily when long working distances are used, such as viewing an end of a fiber optic through a bulkhead, and improve image contrast. The scope may also generate an optical image that may be either viewed through an eyepiece or converted into an electrical signal that may be viewed on a computer screen. The scope may also have an adaptive structure that permits the scope to inspect a fiber optic through a plurality of different bulkheads.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. An apparatus for inspecting an end surface of a fiber optic, comprising:

a scope body having an adapter that mates the scope body with a bulkhead connected to an end surface of a fiber optic;

means for generating light at a selected angle to the end surface of the fiber optic, located within the scope body, so that the light impinges on the end surface of the fiber optic through the bulkhead at the selected angle and an image of the end surface of the fiber optic is generated wherein an imperfection located on the end surface of the fiber optic casts a shadow on the image of the end surface of the fiber optic; and means for receiving the image of the end surface of the fiber optic wherein the imperfection on the end surface of the fiber optic cable is detected and enhanced due to the shadow in the image.

2. The apparatus of claim 1 further comprising means for directing the image of the end surface of the fiber optic through the bulkhead to one of an eyepiece for viewing said image or an image receiving device that converts said image into a plurality of electrical signals.

3. The apparatus of claim 2, wherein said directing means comprises a reflecting device that tilts between a first position and a second position wherein the image is directed to the eyepiece when said reflecting device is in said first position, and the image is directed to said image receiving device when said reflecting device is in said second position.

4. The apparatus of claim 2 further comprising a handle portion attached to said scope body, and wherein said image receiving device comprises a charge coupled device located within said handle.

5. The apparatus of claim 1, wherein said light generating means comprises a light source that generates white light and a reflecting device that tilts between a plurality of positions in order to change the angle that the white light from the light source impinges on the end surface of the fiber optic.

6. The apparatus of claim 1, wherein said light generating means comprises a light source that generates ultraviolet light and a reflecting device that tilts between a plurality of positions in order to change the angle that the ultraviolet light from the light source impinges on the end surface of the fiber optic.

7. The apparatus of claim 5, wherein said reflecting device is tilted manually by an operator of the apparatus.

8. The apparatus of claim 5, wherein said reflecting device is tilted automatically to a predetermined position so that a predetermined quality of the image of the end surface of the fiber optic is obtained.

9. The apparatus of claim 3 further comprising means for adjusting the magnification of the eyepiece.

10. The apparatus of claim 1 further comprising means for reducing unwanted reflections of light inside said scope body to enhance image contrast.

11. The apparatus of claim 10, wherein said reducing means comprises a coating located on the inside of said scope body and a diaphragm located within the scope body that permits only a limited amount of light within said scope body and its optical path.

12. The apparatus of claim 1 further comprising a prism located within said scope body having a half-mirrored surface so that light illuminates said end surface of said fiber optic and an optical image of said end surface passes through said prism.

13. A method for inspecting an end surface of a fiber optic, comprising:

mating a scope body with an adapter with a bulkhead connected to an end surface of a fiber optic;

generating light at a selected angle to the end surface of the fiber optic, located within the scope body, so that the light impinges on the end surface of the fiber optic through the bulkhead at the selected angle and an image of the end surface of the fiber optic is generated wherein an imperfection located on the end surface of the fiber optic casts a shadow on the image of the end surface of the fiber optic; and receiving the image of the end surface of the fiber optic wherein the imperfection on the end surface of the fiber optic cable is detected and enhanced due to the shadow in the image.

14. The method of claim 13 further comprising directing the image of the end surface of the fiber optic to one of an eyepiece for viewing said image or an image receiving device that converts said image into a plurality of electrical signals.

15. The method of claim 14, wherein directing comprises tilting a reflecting device between a first position and a second position wherein the image is directed to the eyepiece when said reflecting device is in said first position, and the image is directed to said image receiving device when said reflecting device is in said second position.

16. The method of claim 14 further comprising providing a handle portion attached to said scope body, and wherein said image receiving device comprises a charge coupled device located within said handle.

17. The method of claim 13, wherein light generating comprises providing a light source that generates white light and tilting a reflecting device between a plurality of positions in order to change the angle that the white light from the light source impinges on the end surface of the fiber optic.

18. The method of claim 13, wherein light generating comprises providing a light source that generates ultraviolet light and tilting a reflecting device between a plurality of positions in order to change the angle that the ultraviolet light from the light source impinges on the end surface of the fiber optic.

19. The method of claim 17, wherein said reflecting device is tilted manually by an operator of the apparatus.

20. The method of claim 17, wherein said reflecting device is tilted automatically to a predetermined position so that a predetermined quality of the image of the end surface of the fiber optic is obtained.

21. The method of claim 15 further comprising adjusting the magnification of the eyepiece.

22. The method of claim 13 further comprising reducing unwanted reflections of light inside said scope body in order to enhance image contrast.

23. The method of claim 22, wherein reducing comprises coating the inside of said scope body and providing a diaphragm located within the scope body that permits only a limited amount of light within said scope and its optical path.

24. An apparatus for inspecting an end surface of a fiber optic, comprising:

a portable scope body having an adapter that mates the scope body with a bulkhead connected to an end surface of a fiber optic;

means for illuminating the end surface of the fiber optic through said bulkhead to generate an image of the end surface;

means for receiving said image of said end surface; and means for converting said image into a plurality of electrical signals so that the image is reviewed at a location remote to a location where the fiber optic is being tested.

* * * * *